United States Patent Office 3,829,493
Patented Aug. 13, 1974

---

3,829,493
PROCESS FOR PREPARING d-N,N' - BIS-(1 - HYDROXYMETHYLPROPYL)-ETHYLENE DIAMINE
Ivan Butula and Gordana Karlović, Zagreb, Yugoslavia, assignors to PLIVA Pharmaceutical and Chemical Works
No Drawing. Filed Feb. 8, 1973, Ser. No. 330,505
Claims priority, application Yugoslavia, June 9, 1972, 1,545/72
Int. Cl. C07c 91/12
U.S. Cl. 260—584 R
3 Claims

ABSTRACT OF THE DISCLOSURE

The invention disclosed relates to a process for preparing d-N,N' - bis - (1-hydroxymethylpropyl)-ethylene diamine and the acid salts thereof by reducing d-4,4'-diethyl-2,2'-bisoxazolidine using either lithium aluminum hydride or sodium boron hydride.

---

This invention relates to a process for preparing d-N,N'-bis-(1-hydroxymethylpropyl)-ethylene diamine of the formula:

$$C_2H_5-CH-\!\!\cdots\!\!-CH-C_2H_5$$
$$\phantom{C_2H_5-}|\phantom{CH-\!\!\cdots\!\!-}|$$
$$\phantom{C_2H_5-}CH_2OH\phantom{--}CH_2OH$$

and the acid salts thereof.

This compound (I) is used in compositions for treating tuberculosis and is particularly useful in the treatment of diseases that are resistant to streptomycin.

There are known several methods for obtaining this compound (I) and related compounds thereof.

According to the British Patent Specification 961,317 a mixture of optical isomers of this compound (I) is obtained *inter alia* by the alkylation of 2-amino-butanol with ethylene dihalides. The disadvantage of this method is that it requires use of a great excess of the expensive optically active 2-amino-butanol which is required in order to avoid a multiple alkylation of the amino-alcohol.

According to the Japanese Patent Specifications 15,163 (1965)—Chem. Abstr., *64* (1966), p. 594d—there is prepared a mixture of optical isomers of d-N,N'-bis-(1-hydroxymethylpropyl)-ethylene diamine by the condensation of the racemic 2-amino-butanol with polyglyoxal and hydrogenolysis of the obtained bisoxazolidine with Raney nickel at high temperatures and pressures.

In Yugoslavian Patent Applications P 2,007/70 of Aug. 17, 1970 and P 1,184/71 of May 12, 1971 there has been described, *inter alia,* the preparation of compound (I) by hydrogenolysis of d-4,4'-diethyl-2,2'-bisoxazoline with platinum and rhodium as catalysts. It has now been found that d-N,N'-bis-(1-hydroxymethylpropyl)-ethylene diamine may be prepared with a high yield by the reduction of 4,4'-diethyl-2,2'-bisoxazolidine of the formula II:

$$\begin{array}{c}CH_2-O\phantom{XXXX}O-CH_2\\|\phantom{XX}\diagdown\phantom{XX}\diagup\phantom{XX}|\\H_5C_2-CH-N\phantom{XXX}N-CH-C_2H_5\\|\phantom{XXXXXXXX}|\\H\phantom{XXXXXXXX}H\end{array}\quad\text{(II)}$$

with lithium aluminium hydride or sodium boron hydride.

The process is carried out in such a way that by the condensation of the optically active d-2-amino-butanol with glyoxal in ethanol, there is obtained d-4,4'-diethyl-2,2'-bisoxazolidine with a melting point of 52° C., and the latter is then reduced by heating over several hours at the boiling point with LiAlH$_4$ in ether or tetrahydrofuran, or even simpler, with NaBH$_4$ in lower alcohols or water. After the usual treatment there is obtained the free base of compound (I), which is added by hydrogen chloride to form the dihydrochloride of the compound (I). Practice of the present invention will become more apparent from the following non-limiting examples.

EXAMPLE 1

Anhydrous ether (15 mls.) and lithium aluminium hydride (0.5 gs.) are charged into a flask. Under stirring a solution of 4,4'-diethyl-2,2'-bisoxazolidine (1.0 g. amount which equals 5 mmoles) in ether (20 mls.) is added drop by drop. The mixture is warmed up to the boiling point and stirring is continued at the said temperature for another hour. After cooling to room temperature, 6 mls. of sodium hydroxide (2% aqueous solution) is added to the mixture and the formed inorganic precipitate is removed by vacuum filtration. The filtrate is evaporated to dryness, the residue is dissolved in chloroform, filtered and once more evaporated to dryness. The obtained crude d-N,N'-bis-(1-hydroxymethylpropyl)-ethylene diamine is, by the addition of alcoholic hydrochloric acid, converted into the dihydrochloride. The yield is 1.1 g. (78.6%), melting point of 198–200° C.

EXAMPLE 2

To a solution of 4,4'-diethyl-2,2'-bisoxazolidine (1.0 g. amount which equals 5 mmoles) in 20 mls. of methanol, isopropanol or water is added sodium boron hydride (0.6 gs.) and the mixture is heated to boiling for 4 hours. After cooling, to the mixture is added 6 mls. of sodium hydroxide (2% aqueous solution) and thereafter the solvent is evaporated to dryness. The residue is extracted with chloroform to give 75 to 78% of d-N,N'-bis-(1-hydroxymethylpropyl)-ethylene diamine, having a melting point of 80–82° C. By the addition of ethanolic hydrochloric acid to this base, there is obtained the dihydrochloride of high purity, having a melting point of 200–202° C.

What is claimed is:

1. A process for preparing d-N,N'-bis-(1-hydroxymethylpropyl)-ethylene diamine which comprises, reducing d-4,4'-diethyl-2,2'-bisoxazolidine with sodium boron hydride in solution and recovering d-N,N'-bis-(1-hydroxymethylpropyl)-ethylene diamine.

2. The process of Claim 1 wherein said reducing is effected using sodium boron hydride in a solvent selected from the group consisting of lower alcohol and water.

3. The process of Claim 1 wherein the recovered d-N,N'-bis-(1-hydroxymethylpropyl)-ethylene diamine is converted to the dihydrochloride salt by reacting with hydrogen chloride and thereafter recovering the dihydrochloride salt of d-N,N'-bis-(1-hydroxymethylpropyl)-ethylene diamine.

References Cited

J. Amer. Chem. Soc., vol. 73, 5662–4.

LEWIS GOTTS, Primary Examiner

D. R. PHILLIPS, Assistant Examiner